(12) United States Patent
Chan

(10) Patent No.: US 12,448,175 B1
(45) Date of Patent: Oct. 21, 2025

(54) SCENT CONTAINER AND A DRINKING DEVICE HEAD

(71) Applicant: YiuPak Chan, Hong Kong (HK)

(72) Inventor: YiuPak Chan, Hong Kong (HK)

( * ) Notice: Subject to any disclaimer, the term of this patent is extended or adjusted under 35 U.S.C. 154(b) by 86 days.

(21) Appl. No.: 18/643,152

(22) Filed: Apr. 23, 2024

(51) Int. Cl.
*B65D 23/12* (2006.01)
*A23L 27/00* (2016.01)
*B65D 47/08* (2006.01)

(52) U.S. Cl.
CPC ............. *B65D 23/12* (2013.01); *A23L 27/72* (2016.08); *B65D 47/0804* (2013.01)

(58) Field of Classification Search
CPC .... B65D 47/0804; B65D 23/12; B65D 23/00; B65D 51/245; B65D 2023/12; B65D 75/5855; A23L 27/72; A23L 1/2208; B32B 7/12; B32B 27/18
USPC ............................................. 206/205; 53/485
See application file for complete search history.

(56) References Cited

U.S. PATENT DOCUMENTS

| | | | | |
|---|---|---|---|---|
| 3,409,181 A * | 11/1968 | McDonnell | ............ | B65D 1/323 222/211 |
| 5,165,603 A * | 11/1992 | Hahn | ................. | A45D 40/0068 206/823 |
| 5,477,640 A * | 12/1995 | Holtkamp, Jr. | ......... | A61L 9/048 239/289 |
| 5,635,229 A * | 6/1997 | Ray | ........................ | B65D 23/12 426/115 |
| 5,795,644 A * | 8/1998 | Delarosa | ............... | B65D 75/323 428/905 |
| 5,806,242 A * | 9/1998 | Park | ........................ | A01G 27/06 47/79 |
| 6,006,472 A * | 12/1999 | Holtkamp, Jr. | ......... | A01G 27/04 47/79 |
| 6,102,224 A * | 8/2000 | Sun | ...................... | B65D 51/1688 215/329 |
| 6,112,749 A * | 9/2000 | Hall | ........................ | A61J 11/003 215/11.1 |
| 6,290,914 B1 * | 9/2001 | LeJeune | .............. | A01M 1/2088 422/123 |
| 6,511,726 B1 * | 1/2003 | Kinigakis | ................. | B32B 1/00 428/137 |
| 7,005,152 B2 * | 2/2006 | Landau | .............. | A47G 19/2227 426/106 |
| 7,470,035 B1 * | 12/2008 | Benitez | ................ | B65D 51/248 362/101 |
| 7,798,320 B2 * | 9/2010 | Pham | ..................... | B65D 65/42 229/87.13 |

(Continued)

*Primary Examiner* — Ernesto A Grano
(74) *Attorney, Agent, or Firm* — Olive Law Group, PLLC

(57) ABSTRACT

The present invention discloses a scent container and a drinking device head. The scent container comprises a sealing shell and a suction nozzle. One end of the suction nozzle is arranged in the sealing shell, and other end protrudes upward from upper surface of the sealing shell; inner side wall of the sealing shell and outer side wall of the suction nozzle surround and form an aromatic space for placing aromatic substances; at least one first opening is arranged on the sealing shell for air to flow into the aromatic space; and at least one second opening is arranged inside the sealing shell and located on the suction nozzle for air to flow out. It increases the taste experience, and when replacing the scent container, the suction nozzle can be replaced at the same time, which is safer and more hygienic.

10 Claims, 8 Drawing Sheets

(56) References Cited

U.S. PATENT DOCUMENTS

| | | | |
|---|---|---|---|
| 8,333,289 B2* | 12/2012 | Lopez | B65D 41/26 206/229 |
| 8,364,028 B1* | 1/2013 | Vaske | A61L 9/012 219/385 |
| 8,440,265 B2* | 5/2013 | Duan | B32B 9/02 428/905 |
| 9,108,763 B2* | 8/2015 | Landau | B65D 25/00 |
| 9,517,871 B2* | 12/2016 | Enko | B65D 65/403 |
| 10,086,104 B2* | 10/2018 | Griffis | B65D 51/24 |
| 10,377,542 B2* | 8/2019 | Lee | B65D 51/18 |
| 10,744,223 B2* | 8/2020 | Griffis | B65D 23/12 |
| 10,864,293 B2* | 12/2020 | Griffis | B65D 23/12 |
| 11,312,528 B2* | 4/2022 | Griffis | B65D 5/40 |
| 2005/0196571 A1* | 9/2005 | Penny, III | B32B 27/065 428/40.1 |
| 2006/0246265 A1* | 11/2006 | Rogers | B65D 27/00 428/195.1 |
| 2006/0278542 A1* | 12/2006 | Pham | B65D 85/1081 206/268 |
| 2006/0278543 A1* | 12/2006 | Pham | B65D 85/1081 206/242 |
| 2006/0291756 A1* | 12/2006 | Thomas | B65D 33/2525 206/524.4 |
| 2007/0023301 A1* | 2/2007 | Pham | B65D 85/1081 206/242 |
| 2009/0098026 A1* | 4/2009 | Wood | A61L 9/122 422/123 |
| 2009/0155505 A1* | 6/2009 | Wagenheim | A61L 9/127 428/34.1 |
| 2009/0258118 A1* | 10/2009 | Gillian | B65D 17/4012 426/112 |
| 2010/0323134 A1* | 12/2010 | Bostian | B32B 27/08 428/323 |
| 2013/0056551 A1* | 3/2013 | Zhang | A23L 2/56 239/60 |
| 2013/0105066 A1* | 5/2013 | Landau | B65D 81/3453 427/256 |
| 2013/0276339 A1* | 10/2013 | Hernandez | B65D 51/245 40/310 |

* cited by examiner

SCENT CONTAINER AND A DRINKING DEVICE HEAD

TECHNICAL FIELD

The present invention relates to the technical field of drinking devices for adding aromatic substance, and specifically relates to a scent container and a drinking device head.

BACKGROUND

There is an increasing need for people to ingest drinking liquid. On the one hand, the drinking liquid features a pleasant flavor, on the other hand, people need to prevent health risks that may arise from ingesting aromatic substances or stabilizers dissolved in the drinking liquid and need to avoid ingest more calories.

Therefore, water with a slightly fruity scent has become popular in recent years. However, there are also undesirable additives in such flavored water, such as stabilizers and a certain proportion of sugar, which is why these flavored drinks still contain calories that are rejected by many users.

Since smell plays an important role in taste perception in food and beverage consumption, various systems have so far been attempted to influence the odor perceived while drinking. To this end, the patent number of U.S. Pat. No. 5,635,229 proposes a scent element that can be connected to a drinking channel close to a drinking container, so that the scent element is close to the user's nose, and the user breathes through the nose when drinking, thereby perceiving the scent.

The drinking container according to patent publication number of US20220087456A1 still works based on the principle of sensing aromatic substances through the nose when drinking. The drinking device comprises a storage container, a head and a scent container. The head is fastened to the storage container, and a suction nozzle is arranged on the head. The scent contain is detachably arranged on the suction nozzle. Since the suction nozzle is arranged on the head for the user to drink, the user's mouth needs to use the suction nozzle directly every time when drinking. The suction nozzle cannot be replaced and the suction nozzle is not easy to clean. Bacteria can easily breed in the suction nozzle, thereby existing a safety hazard.

SUMMARY OF THE PRESENT UTILITY PATENT

In order to overcome at least one of the above-mentioned defects of the prior art, the present invention provides a scent container, which can increase the taste experience, and can replace the suction nozzle at the same time as the scent container, making it safer and more hygienic.

In order to achieve the above object, the technical solutions adopted by the present invention are: a scent container is detachably mounted on a drinking device, comprising: a sealing shell and a suction nozzle, one end of the suction nozzle is arranged in the sealing shell, and the other end protrudes upward from upper surface of the sealing shell; an aromatic space for placing aromatic substances is surrounded and formed by inner side wall of the sealing shell and outer side wall of the suction nozzle; at least one first opening for air to flow into the aromatic space is arranged on the sealing shell; at least one second opening for air to flow out is arranged in the sealing shell and on the suction nozzle.

A drinking device head, comprising: a main body and a scent container. The main body can be fastened to an opening of a storage container of the drinking device. A drinking channel is arranged on the main body. The main body is provided with a mounting part which is detachably connected to the mounting groove, and outer side wall of the mounting part is provided with a threaded structure. When the mounting groove of the scent container is mounted on the mounting part through the threaded structure, the suction nozzle and the drinking channel are connected; an inserting part for being inserted by one end of a straw is arranged on one side of the main body away from the mounting part; the inserting part is located below the mounting part, and the drinking channel runs through the inserting part and the mounting part in sequence from bottom to top.

After adopting the above technical solutions, the beneficial effects of the present invention are: the sealing shell of the scent container is detachably mounted on the drinking device head, so that users can replace the scent container with different scents according to their preference; a drinking channel is arranged on the drinking device head, and the scent container is detachably mounted on the head. Users can use a suction nozzle which passes through the scent container to drink liquid in the storage container of the drinking device, and no need to arrange a suction nozzle on the head, so that when the scent container is replaced, the suction nozzle can be also replaced, making the liquid in drinking device consumed by the user safer and more hygienic.

When using the drinking device equipped with the scent container of this embodiment, both pure liquid and flavored air are ingested orally, and then the flavored air rises to the olfactory mucosa (olfactory area) after passing through the pharynx, thereby achieving to cause taste impressions in the brain.

BRIEF DESCRIPTION OF THE FIGURES

In order to more clearly illustrate the technical solutions in the embodiments according to the present invention or prior art, the figures to be used in the description of the embodiments or prior art will be briefly introduced below. It will be obvious that the figures in the following description are only some of the embodiments of the present invention, and that for a person of ordinary skill in the field, other figures can be obtained based on the figures without inventive efforts.

In the figures.

Figure 1:
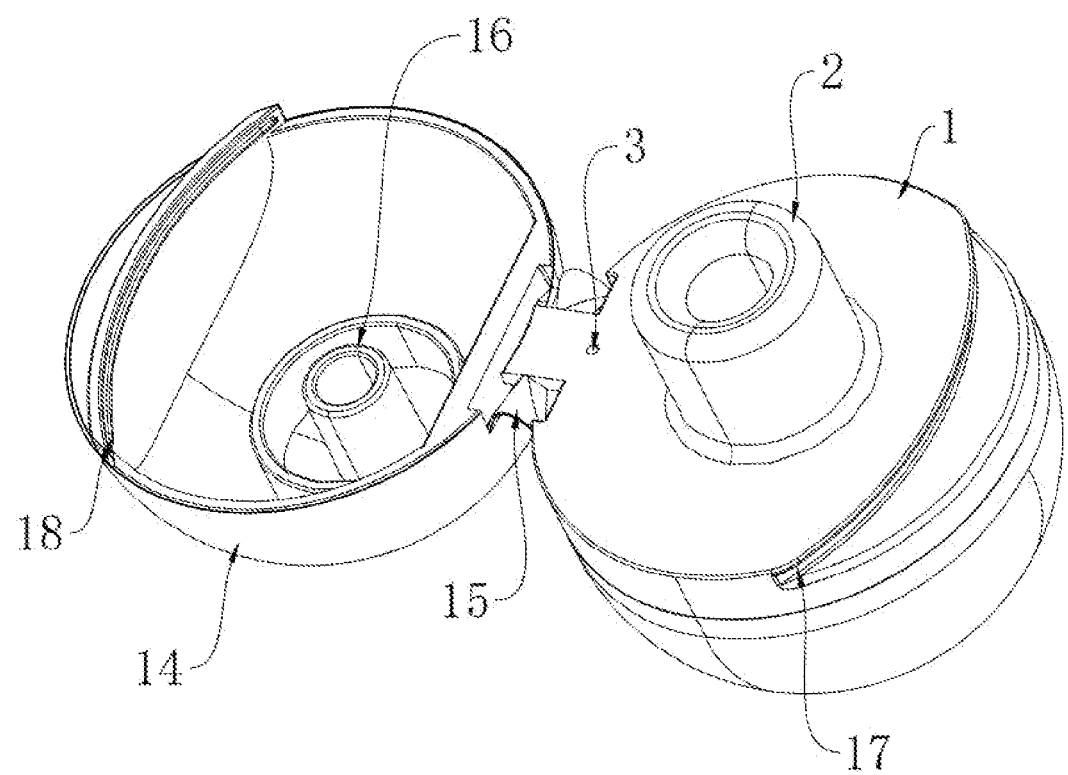
FIG. 1 is a schematic structural diagram of a scent container.

1. sealing shell; 2. suction nozzle; 3. first opening; 4. second opening; 5. aromatic space; 6. lower shell; 7. upper shell; 8. connecting pipe; 9. nozzle part; 10. first fixing groove; 11. second fixing groove; 12. first fixing part; 13. second fixing part; 14. flip cover; 15. hinge;

16. blocking part; 17. fastening groove; 18. fastening convex block; 19. groove; 20. mounting groove; 21. first sealing ring; 22. main body; 23. drinking channel; 24. mounting part; 25. inserting part; 26. second sealing ring; 27, mounting hole; 28. exhaust hole; 29. sealing unit; 30. recessed groove; 31. elastic sleeve; 32. handle.

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

Embodiment 1

This embodiment relates to a scent container, as shown in FIGS. 1-4, a scent container is detachably mounted on a drinking device. The scent container comprises a sealing shell 1 and a suction nozzle 2. One end of the suction nozzle 2 is arranged in the sealing shell 1, and the other end protrudes upward from upper surface of the sealing shell 1. The user can drink liquid in the drinking device through the suction nozzle 2. Inner side wall of the sealing shell 1 and outer side wall of the suction nozzle 2 surround and form an aromatic space 5 for placing aromatic substances (not shown). The sealing shell 1 is provided with at least one first opening 3 for allowing air to flow into the aromatic space 5. At least one second opening 4 for air to flow out is arranged inside the sealing shell 1 and on the suction nozzle 2. Specifically, the sealing shell 1 of the scent container is detachably amounted on the drinking device head, so that users can replace the scent container with different scents according to their preference. A drinking channel 23 is arranged on the drinking device head, and the scent container is detachably mounted on the drinking device head and above the drinking channel 23, which realize to drink the liquid in the storage container of the drinking device through the suction nozzle 2 on the scent container. No need to integrally arrange the suction nozzle 2 on the head, and when the scent container is replaced, users can replace the suction nozzle 2, making the liquid in drinking devices consumed by the user safer and more hygienic.

It should be noted that the aromatic substances can be products made or processed from other aromatic substances such as juice, peel, licorice, mint, clove, osmanthus, etc.

When using the drinking device equipped with the scent container of this embodiment, both pure liquid and the flavored air are ingested orally, and the flavored air is mixed with the drinking liquid of the drinking device through the first opening 3, the aromatic space 5, and the second opening 4, and then enters the user's mouth together. The flavored air passes through the mouth and then enters the olfactory mucosa. An impression is given to the user through receptors located in the olfactory mucosa and neural processing of sensory stimulation, that is, the pure liquid the user is drinking has a taste added by the scent.

Figure 2:
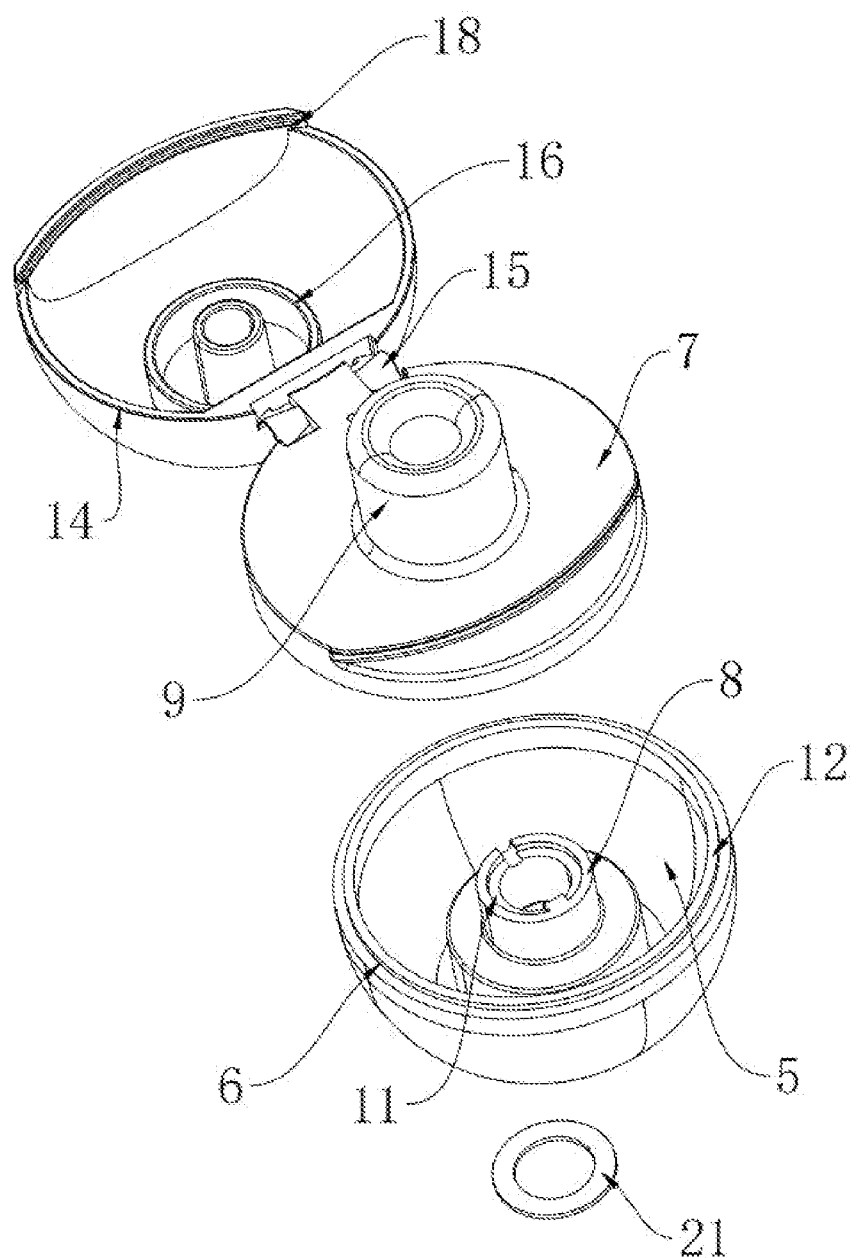
FIG. 2 is an exploded diagram of the scent container.
Figure 3:
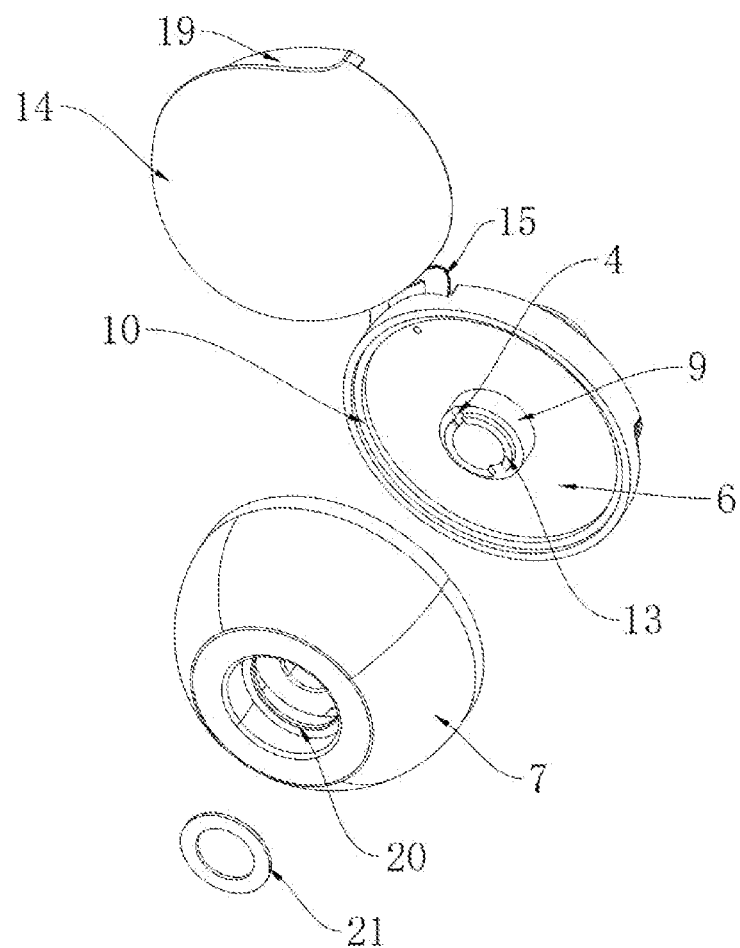
FIG. 3 is a schematic structural diagram of the scent container from another direction.
Figure 4:
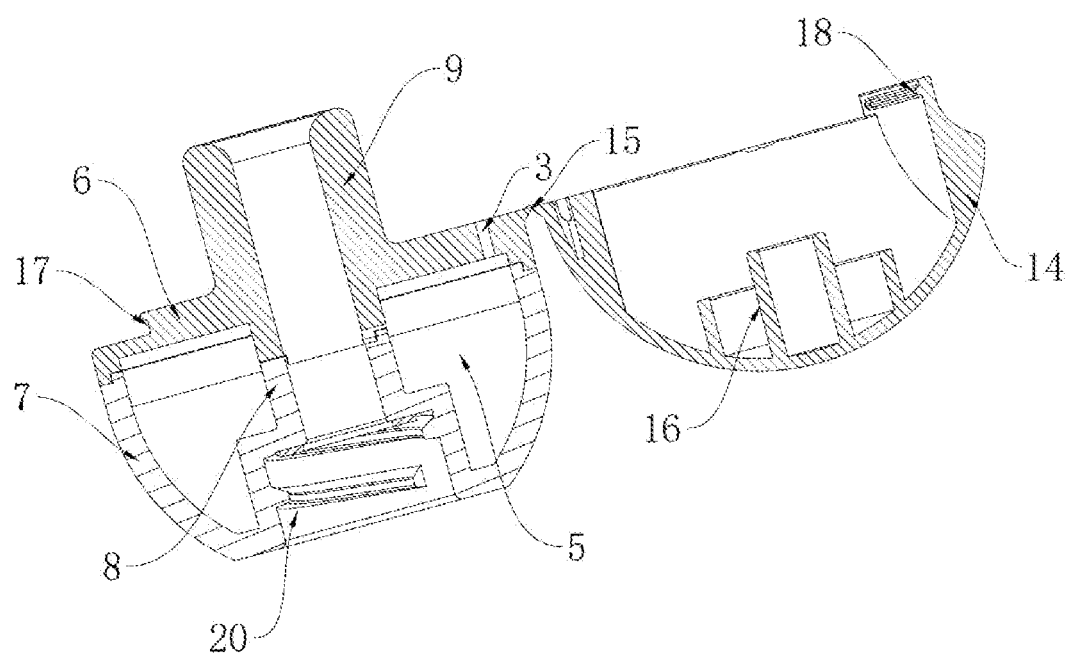
FIG. 4 is a cross-sectional view of the scent container.
Figure 5:
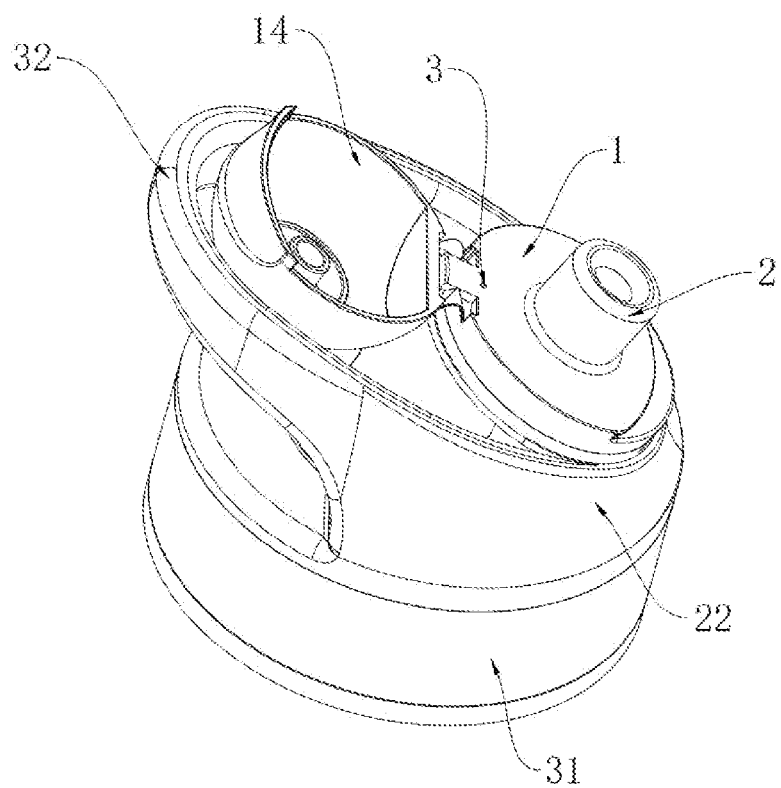
FIG. 5 is a schematic structural diagram of a drinking device head.

Optionally, in order to facilitate the filling of aromatic substances into the aromatic space 5 for assembly and production of scent containers, as shown in FIGS. 2-4, the sealing shell 1 comprises: a lower shell 6 and an upper shell 7. The upper shell 7 is covered on the lower shell 6, a part of the suction nozzle 2 is arranged in the lower shell 6, and the other part is arranged on the upper shell 7. The aromatic space 5 is surrounded and formed by the suction nozzle 2, the upper shell 7 and the lower shell 6. In this embodiment, the upper shell 7 is covered at an opening at top of the lower shell 6, and the lower shell 6 and the upper shell 7 have an interference fit. In other embodiments, lower surface of the upper shell 7 and upper surface of the lower shell 6 are fixed by adhesive or by hot injection molding.

Further, as shown in FIGS. 2-4, the suction nozzle 2 comprises: a connecting pipe 8 and a nozzle part 9. One end of the connecting pipe 8 is integrally arranged on the lower shell 6. The nozzle part 9 is integrally arranged on the upper shell 7. One end of the nozzle part 9 extends upward to protrude from upper surface of the upper shell 7, and the other end extends downward and is fixedly connected to one end of the connecting pipe 8. When the upper shell 7 is covered on an opening of the lower shell 6, lower end of the nozzle part 9 is detachably connected to upper end of the connecting pipe 8. The nozzle part 9 is interference-fitted with the connecting pipe 8. Preferably, lower end of the connecting pipe 8 is integrally formed with the lower shell 6, and the nozzle part 9 is integrally formed with the upper shell 7.

Optionally, as shown in FIG. 2-4, in order to ensure the tightness between the upper shell 7 and the lower shell 6, and to reduce the leakage of flavored air from the gap between the upper shell 7 and the lower shell 6, an annular first fixing groove 10 extending upward from lower surface of the upper shell 7, an annular second fixing groove 11 extends downward from upper surface of the connecting pipe 8, an annular first fixing part 12 protrudes upward from the lower shell 6 and capable of being inserted into the first fixing groove 10, and an annular second fixing part 13 protrudes downward from lower end surface of the nozzle part 9 and capable of being inserted into the second fixing groove 11. In this embodiment, the first fixing part 12 has an interference fit with the first fixing groove 10, and the second fixing part 13 has an interference fit with the second fixing groove 11.

Optionally, one end of the connecting pipe 8 is integrally arranged on middle part of the aromatic space 5 of the lower shell 6, and the nozzle part 9 penetrates middle part of the upper shell 7 and is integrally formed with the upper shell 7. Optionally, the lower shell 6 is in a semi-spherical shape but is not limited to a semi-spherical shape.

Optionally, the scent container further comprises a flip cover 14 and a hinge 15. The flip cover 14 is connected to the sealing shell 1 through the hinge 15. The flip cover 14 can be flipped around the hinge 15, so that the flip cover 14 can protect the suction nozzle 2 between the sealing cover and the flip cover 14, or the flip cover 14 can be opened relative to the sealing shell 1 for facilitating the user to use the suction nozzle. A blocking part 16 is arranged in the flip cover 14. When the flip cover 14 is placed outside the nozzle part 9, the blocking part 16 is inserted into the nozzle part 9 to seal the nozzle part 9. In this embodiment, the first opening 3 is arranged on upper surface of the upper shell 7, and the first opening 3 is close to on side of the hinge 15.

In this embodiment, the blocking part 16 comprises an annular sleeve and a blocking block. The annular sleeve is integrally arranged on middle part inside the flip cover 14, and the blocking block is arranged on middle part of the annular sleeve. When the flip cover 14 is covered on the sealing shell 1, the annular sleeve is covered on upper end of the nozzle part 9 and the blocking block is inserted into an opening of the nozzle part 9 to prevent dust from contaminating the suction nozzle 2 or contaminating the liquid of the drinking device when the user drinks the liquid; when the flip cover 14 and the sealing shell 1 are opened, the annular sleeve and the blocking block are detached from the nozzle part 9 to facilitate drinking of the liquid in the drinking device. In this embodiment, both ends of the hinge 15 are integrally formed with the flip cover 14 and the sealing shell 1 respectively, and the hinge 15 is made of elastically deformable plastics. In other embodiments, the hinge 15 may be a hinge structure in which one part is arranged on the flip cover 14 and the other part is arranged on the sealing shell 1.

Optionally, a third sealing ring is arranged inside the flip cover 14 and located inside the annular sleeve, and the third sealing ring is sleeved outside the blocking block. When the flip cover 14 is covered on the sealing shell 1, the third sealing ring is located above the nozzle part 9.

Optionally, in order to achieve that the flip cover 14 is stably covered on the sealing cover, a fastening part is arranged on one side of upper surface of the sealing shell 1 away from the hinge 15, and the longitudinal cross-section of the fastening part is L-shaped. A fastening groove 17 is arranged on side wall of the fastening part. Inner side wall of one side of the flip cover 14 away from the hinge 15 is provided with a fastening convex block 18 capable of engaging with the fastening groove 17. In this embodiment, the fastening groove 17 and the fastening convex block 18 are both arc-shaped. In another specific embodiment, the fastening groove 17 and the fastening convex block 18 are not limited to arc shapes. In this embodiment, a groove 19 is recessed inwardly on outer side wall of the flip cover 14 for facilitating opening the flip cover 14. The groove 19 is located above the fastening convex block 18.

Optionally, in order to facilitate the user to replace the scent container, a mounting groove 20 connected to the suction nozzle 2 extends upward from lower surface of the sealing shell 1, and a threaded structure is arranged on inner side wall of the mounting groove 20. The sealing shell 1 can be detachably mounted on the drinking device through the mounting groove 20 and the thread structure in the mounting groove 20. In this embodiment, in order to prevent liquid from leaking from the gap between the sealing shell 1 and the drinking device head, a first sealing ring 21 is arranged in the mounting groove 20. It should be noted that the sealing shell 1 can be made of hard plastic but is not limited to hard plastic. The sealing shell 1 can also be made of other hard materials. The first sealing ring 21 and the third sealing ring are both made of silicone.

Embodiment 2

This embodiment is an improvement based on Embodiment 1. A drinking device head, as shown in FIGS. 5-8, enables the user to drink the liquid in the drinking device through a straw on the scent container, and at the same time facilitates the user to replace the scent container. The drinking device head comprises: a main body 22 and the above-mentioned scent container. The main body 22 can be fastened to the opening of the storage container of the drinking device. The main body 22 is provided with a drinking channel 23. The main body 22 is provided with a mounting groove 24 which is detachably connected with the mounting groove 24. Outer side wall of the mounting part 24 is provided with a threaded structure. When the mounting groove 20 of the scent container is mounted on the mounting part 24 through the threaded structure, the suction nozzle 2 is connected to the drinking channel 23. The main body 22 is provided with an inserting part 25 on one side of the main body 22 away from the mounting part 24 for one end of the straw to be inserted in. The inserting part 25 is located below the mounting part 24. The drinking channel 23 passes through the inserting part 25 and the mounting part 24 in sequence from bottom to top. The straw is a silicone straw in the prior art.

Figure 7:
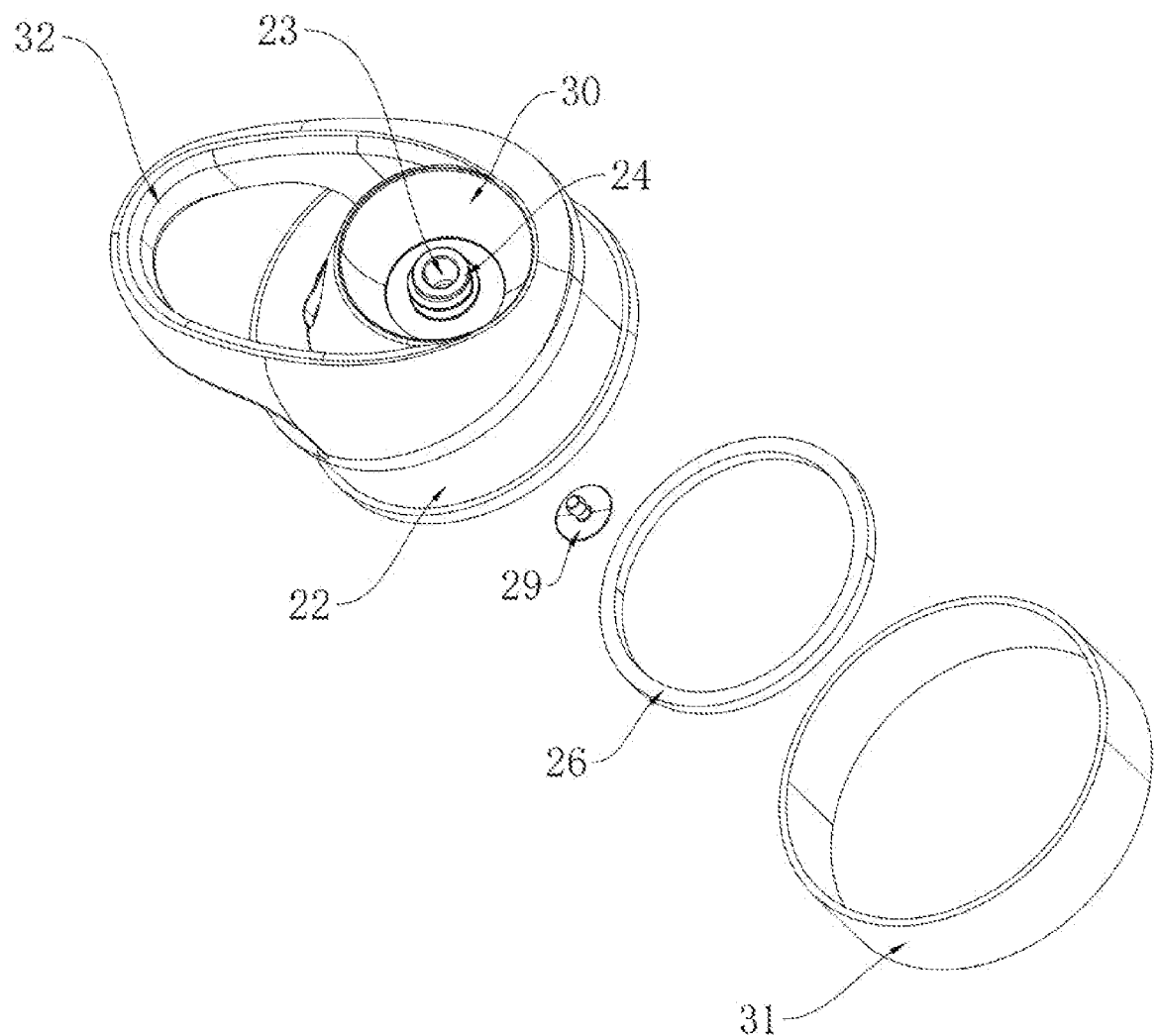
FIG. 7 is an exploded schematic view of the main body of the drinking device head.
Figure 8:
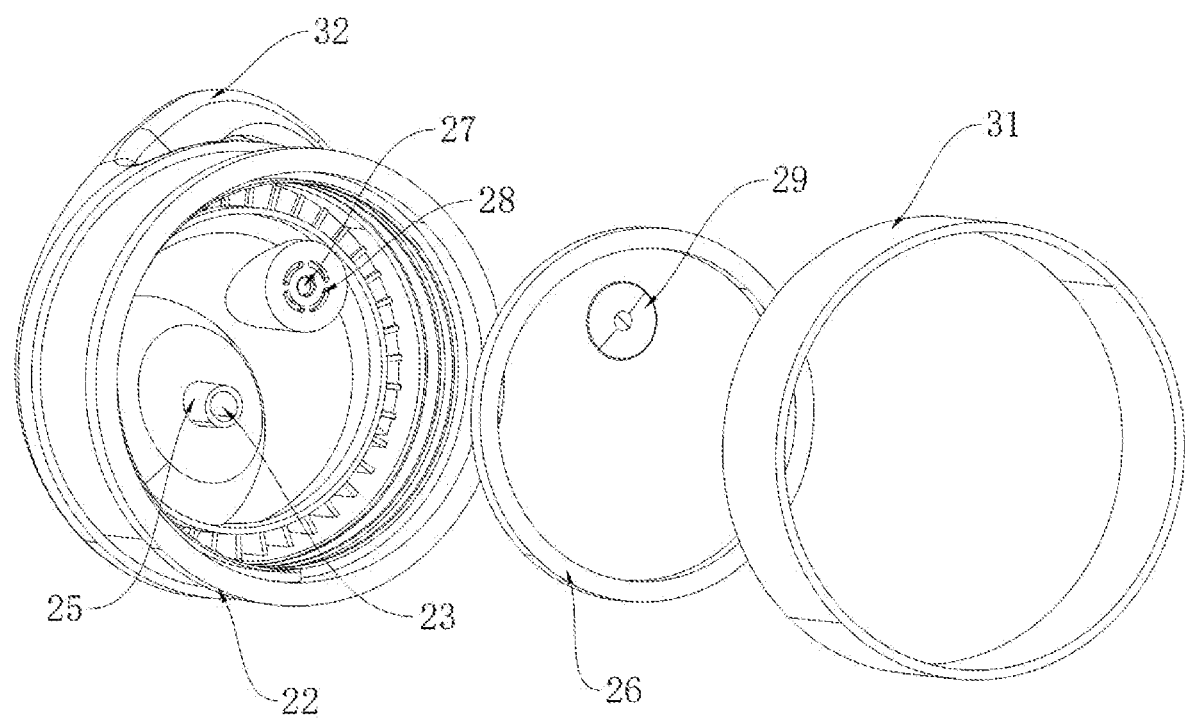
FIG. 8 is an exploded schematic view of the main body of the drinking device head from another direction.

It should be noted that the main body 22 is used to cover on top of the storage container. Inner side wall of the main body 22 is provided with an internal thread structure, and outer side wall of top of the storage container is provided with an external thread structure that can engage and fix with the internal thread structure of the main body 22. As shown in FIGS. 7 and 8, a second sealing ring 26 is arranged inside the main body 22. When the main body 22 is fastened to the storage container, the second sealing ring 26 is located above the storage container to prevent liquid from leaking from the gap between the main body 22 and the storage container. In this embodiment, the second sealing ring 26 is made of silicone.

Figure 6:
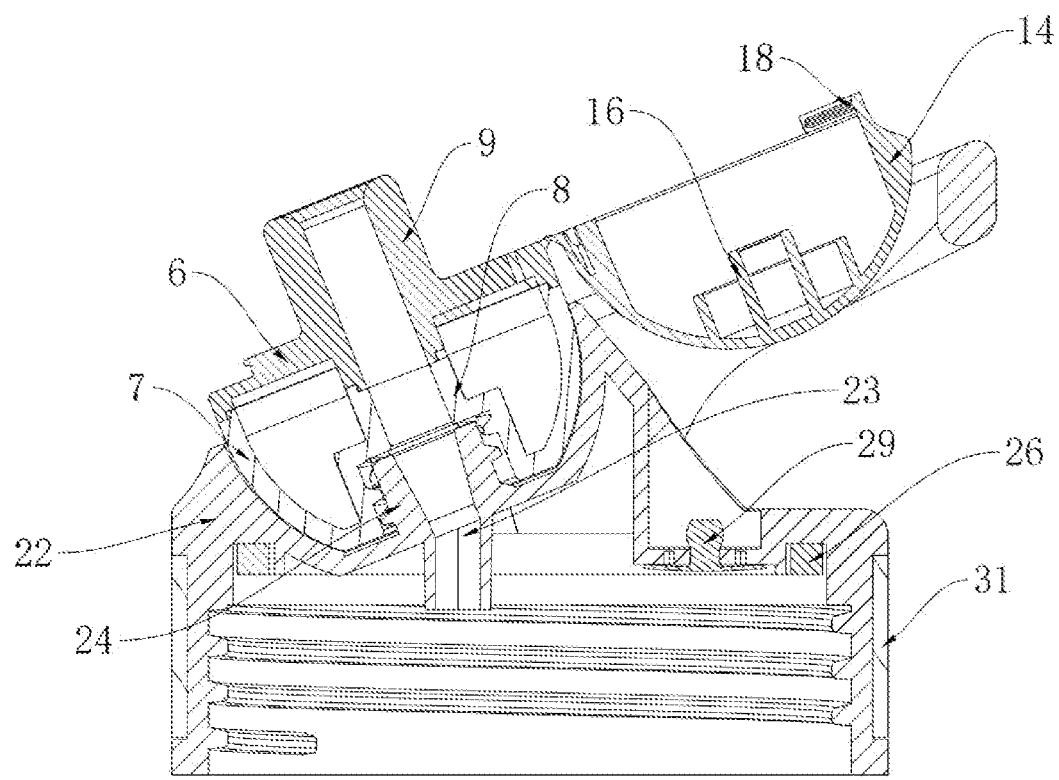
FIG. 6 is a cross-sectional view of the drinking device head.

Optionally, as shown in FIGS. 6-8, in order to avoid difficulty in opening the head or flip cover 14 when the air pressure of the drinking device is higher than the outside air pressure, a mounting hole is arranged on top of the main body 22 and located on one side of the mounting part 24. The main body 22 is provided with a plurality of exhaust holes 28 distributed along the circumference with the mounting hole 27 as the center, the main body 22 further comprises: a sealing unit 29, wherein the sealing unit 29 is arranged in the main body 22; one part of the sealing unit 29 is limited in the mounting hole 27, and the other part can cover lower surface of the exhaust holes 28. In this embodiment, the sealing unit 29 comprises: a limiting rod and a sealing piece. Lower end of the limiting rod is integrally formed with middle part of the sealing piece. Size of top end of the limiting rod is larger than diameter of the mounting hole 27, and length of the limiting rod is larger than depth of the mounting hole 27. When it is necessary to relieve the pressure of the drinking device, upper end of the limiting rod can be pressed downward to cause the sealing piece to move downward and separate from the exhaust holes 28 to exhaust and relieve pressure so that the user can open the head or flip cover 14.

Optionally, as shown in FIGS. 6-8, a recessed groove 30 extends downward from upper surface of the main body 22, the mounting part 24 protrudes upward from bottom surface of the recessed groove 30, and lower part of the sealing shell 1 can be accommodated in the recessed groove 30. In this embodiment, the recessed groove 30 is adapted to the lower shell 6. Preferably, the recessed groove 30 is hemispherical but is not limited to hemispherical.

Optionally, in order to make the drinking device head more beautiful, as shown in FIGS. 7 and 8, an annular limiting groove is arranged on outer side wall of the main body 22, and the drinking device head further comprises an elastic sleeve 31 set on the limiting groove. The elastic sleeve 31 is provided with decorative patterns or words.

Optionally, as shown in FIGS. 5-8, in order to facilitate the user to carry the drinking device, a handle 32 is integrally arranged on top of the main body 22. The handle portion 32 is C-shaped, n-shaped, or V-shaped, and extends obliquely upward from one end close to the recessed groove 30. The exhaust hole is located below the handle 32.

The above only aims to illustrate the technical solution of the present invention without limitation. Any other modifications or equivalent replacements of the technical solution of the present invention made by ordinary skilled in the art should be included in the scope of the claims of the present invention as long as they do not deviate from the technical solution spirit and scope of the present invention.

The invention claimed is:

1. A scent container, detachably mounted on a drinking device, wherein the scent container comprises a sealing shell and a suction nozzle; one end of the suction nozzle is arranged in the sealing shell, and other end protrudes upward from upper surface of the sealing shell;
    inner side wall of the sealing shell and outer wall of the suction nozzle surround together to form an aromatic space for placing aromatic substances; the sealing shell is provided with at least one first opening for air to flow into the aromatic space; at least one first opening is arranged on the sealing shell for air to flow into the aromatic space; and one end of the suction nozzle inside the sealing shell is provided with at least one second opening for air to flow out.

2. The scent container according to claim 1, wherein the sealing shell comprises: a lower shell and an upper shell; the upper shell is covered on the lower shell, a part of the suction nozzle is arranged in the lower shell, and other part is arranged on the upper shell; the aromatic space is surrounded and form by the suction nozzle, the upper shell and the lower shell.

3. The scent container according to claim 2, wherein the suction nozzle comprises: a connecting pipe and a nozzle part;
    one end of the connecting pipe is integrally arranged on the lower shell;
    the nozzle part is integrally arranged on the upper shell; one end of the nozzle part extends upward to protrude from upper surface of the upper shell, and the other end extends downward and is detachably connected to one end of the connecting pipe.

4. The scent container according to claim 3, wherein an annular first fixing groove extends upward from lower surface of the upper shell, and an annular second fixing groove extends downward from upper surface of the connecting pipe; the lower shell protrudes upward with an annular first fixing part that can be inserted into the first fixing groove, and lower end surface of the nozzle part protrudes downward with an annular second fixing part that can be inserted into the second fixing groove.

5. The scent container according to claim 1, wherein the scent container further comprises a flip cover and a hinge; the flip cover is connected to the sealing shell through the hinge, and a blocking part is arranged in the flip cover; when the flip cover is covered outside the nozzle part, the blocking part is inserted into the nozzle part to seal the nozzle part.

6. The scent container according to claim 5, wherein a fastening part is arranged on one side of upper surface of the sealing shell away from the hinge, and a fastening groove is arranged on side wall of the fastening part; a fastening convex block which is capable of engaging with the fastening groove is arranged on inner side wall of one end of the flip cover away from the hinge.

7. The scent container according to claim 1, wherein a mounting groove connected to the suction nozzle extends upward from lower surface of the sealing shell, and a threaded structure is arranged on inner side wall of the mounting groove.

8. A drinking device head, comprising: a main body and the scent container according to claim 7, wherein the main body is fastened to an opening of the storage container of the drinking device, and a drinking channel is arranged on the main body; the main body is provided with a mounting part that is detachably connected to the mounting groove; outer side wall of the mounting part is provided with a threaded structure; when the mounting groove of the scent container is mounted on the mounting part through the threaded structure, the suction nozzle is connected with the drinking channel;
    an inserting part is arranged on one side of the main body away from the mounting part to be inserted by one end of a straw, the inserting part is located below the mounting part, and the drinking channel passes through the inserting part and the mounting part in sequence from bottom to top.

9. The drinking device head according to claim 8, wherein a mounting hole is arranged on top of the main body and on one side of the mounting part, and the main body is provided with a plurality of exhaust holes distributed along the circumference with the mounting hole as the center; the main body further comprises: a sealing unit, wherein the sealing unit is arranged in the main body; a part of the sealing unit is limited in the mounting hole, and the other part can cover lower surface of the exhaust hole.

10. The drinking device head according to claim 8, wherein a recessed groove extends downward from upper surface of the main body, the mounting part protrudes upward from bottom surface of the recessed groove, and lower part of the sealing shell can be accommodated in the recessed groove.

* * * * *